United States Patent
Koshikawa et al.

(10) Patent No.: US 9,333,939 B2
(45) Date of Patent: May 10, 2016

(54) AIRBAG, AIRBAG UNIT, AND VENT HOLE OPEN/CLOSE CONTROL METHOD

(71) Applicant: Takata Corporation, Minato-ku, Tokyo (JP)

(72) Inventors: Kimihiro Koshikawa, Tokyo (JP); Yoshiki Murakami, Tokyo (JP)

(73) Assignee: TAKATA CORPORATION, Tokyo (JP)

( * ) Notice: Subject to any disclaimer, the term of this patent is extended or adjusted under 35 U.S.C. 154(b) by 0 days.

(21) Appl. No.: 14/388,632

(22) PCT Filed: Mar. 21, 2013

(86) PCT No.: PCT/JP2013/057960
§ 371 (c)(1),
(2) Date: Oct. 7, 2014

(87) PCT Pub. No.: WO2013/146493
PCT Pub. Date: Oct. 3, 2013

(65) Prior Publication Data
US 2015/0042082 A1    Feb. 12, 2015

(30) Foreign Application Priority Data
Mar. 28, 2012 (JP) ................................ 2012-072631

(51) Int. Cl.
*B60R 21/239* (2006.01)
*B60R 21/203* (2006.01)
*B60R 21/2338* (2011.01)

(52) U.S. Cl.
CPC ............. *B60R 21/239* (2013.01); *B60R 21/203* (2013.01); *B60R 2021/2395* (2013.01); *B60R 2021/23382* (2013.01)

(58) Field of Classification Search
CPC ................ B60R 21/239; B60R 21/203; B60R 2021/23382; B60R 2021/2395
See application file for complete search history.

(56) References Cited

U.S. PATENT DOCUMENTS 5,931,497 A    8/1999  Fischer
7,347,450 B2 * 3/2008  Williams ............ B60R 21/2338
                                                    280/739

(Continued)

FOREIGN PATENT DOCUMENTS

JP    09-142239 A    6/1997
JP    10-053084      2/1998

(Continued)

OTHER PUBLICATIONS

International Search Report mailed Jun. 25, 2013 issued in PCT/JP2013/057960.

*Primary Examiner* — Ruth Ilan
*Assistant Examiner* — Darlene P Condra
(74) *Attorney, Agent, or Firm* — Foley & Lardner LLP

(57) ABSTRACT

Provided are an airbag, an airbag unit, and a vent hole open/close control method that facilitate control of opening and closing of a vent hole, and suppress an increase in weight and cost of the airbag unit vent hole.

The airbag 1 includes a vent hole 4, an open/close device 5 configured to open and close the vent hole 4, and a stretch tether 6 stretchable in stages and connected to the open/close device 5 and an airbag component. The stretch tether 6 assumes, depending on an expansion and unfolding status of the airbag 1, a first stage including transition from a slack state to a tense state, a second stage including stretching to a predetermined length while maintaining the tense state, and a third stage including being slackened when the driver contacts the airbag 1. The open/close device 5 maintains the vent hole 4 in the open state in the first stage, maintains the vent hole 4 in the closed state in the second stage, and shifts the vent hole 4 to the open state in the third stage.

5 Claims, 10 Drawing Sheets

(56) References Cited

U.S. PATENT DOCUMENTS

| | | | |
|---|---|---|---|
| 7,497,469 B2 | 3/2009 | Fischer et al. | |
| 7,607,690 B2 * | 10/2009 | Abe | B60R 21/231 280/739 |
| 7,931,299 B2 | 4/2011 | McFadden et al. | |
| 2007/0102911 A1 * | 5/2007 | Hall | B60R 21/2338 280/739 |
| 2008/0179866 A1 * | 7/2008 | Maertens | B60R 21/233 280/739 |
| 2010/0001498 A1 * | 1/2010 | Abe | B60R 21/2338 280/739 |
| 2010/0133798 A1 * | 6/2010 | Fukawatase | B60R 21/2338 280/743.2 |
| 2010/0201107 A1 * | 8/2010 | Abe | B60R 21/2338 280/730.1 |
| 2012/0001408 A1 * | 1/2012 | Mendez | B60R 21/239 280/739 |
| 2013/0076012 A1 * | 3/2013 | Wook/Kwon | B60R 21/239 280/740 |
| 2014/0300092 A1 * | 10/2014 | Hosoe | B60R 21/239 280/739 |

FOREIGN PATENT DOCUMENTS

| | | |
|---|---|---|
| JP | 2001-151059 | 6/2001 |
| JP | 2001-171456 | 6/2001 |
| JP | 2005-014861 A | 1/2005 |
| JP | 2005-014862 A | 1/2005 |
| JP | 2005-014863 A | 1/2005 |
| JP | 2007-099103 | 4/2007 |
| JP | 2007-099122 A | 4/2007 |
| JP | 2007-216943 A | 8/2007 |
| JP | 2007-307990 | 11/2007 |
| JP | 2008-129143 | 6/2008 |
| JP | 2008-179337 | 8/2008 |
| JP | 2008-189143 | 8/2008 |
| JP | 2008-247270 | 10/2008 |
| JP | WO-2008/136336 | 11/2008 |
| JP | 2009-040260 A | 2/2009 |
| JP | 2009-113757 A | 5/2009 |
| JP | 2009-523638 | 6/2009 |
| JP | 2009-143483 | 7/2009 |
| JP | 2010-058544 | 3/2010 |
| JP | 2010-116010 | 5/2010 |
| JP | 2012-011870 | 1/2012 |
| JP | 2012-020628 | 2/2012 |
| JP | 2012-046072 | 3/2012 |

* cited by examiner

FIG.2
(A)
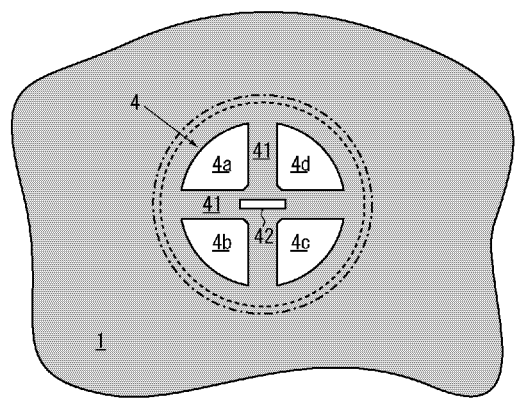
(B)
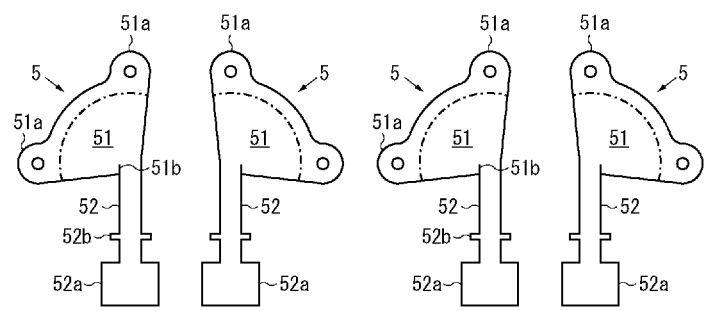
(C)
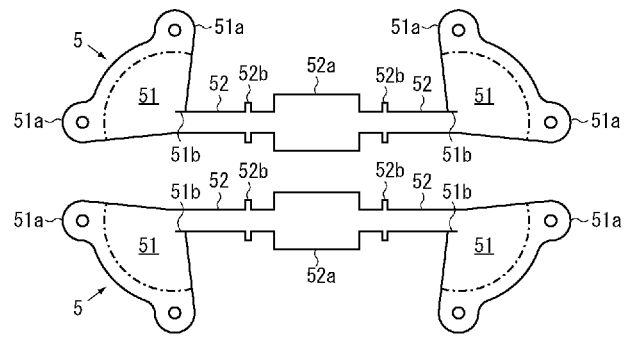

FIG.3
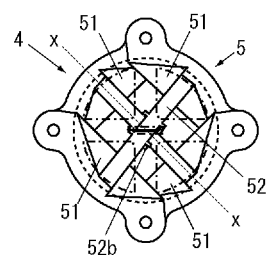
(A)
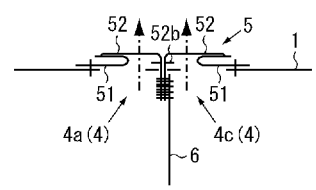
(B)
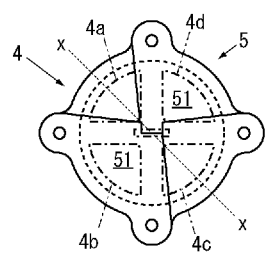
(C)
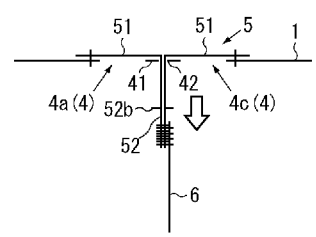
(D)
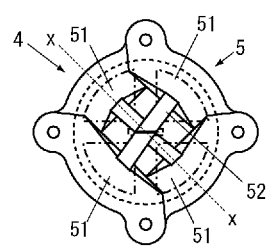
(E)
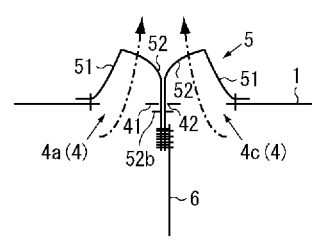
(F)

FIG.10
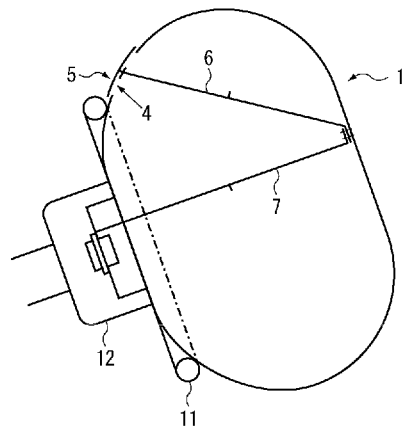
(A)
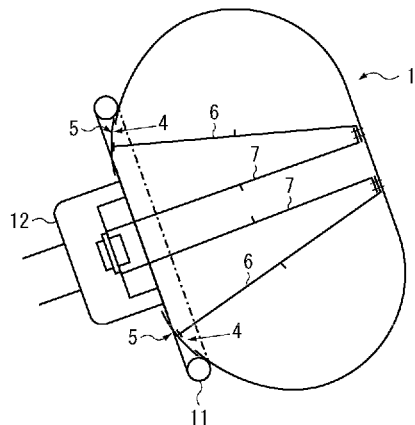
(B)
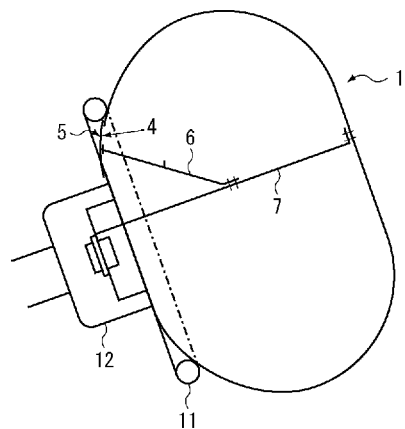
(C)
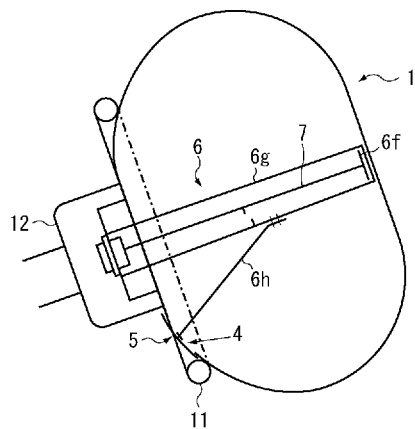
(D)

AIRBAG, AIRBAG UNIT, AND VENT HOLE OPEN/CLOSE CONTROL METHOD

TECHNICAL FIELD

The present invention relates to an airbag, an airbag unit, and a vent hole open/close control method, and in particular to an airbag and an airbag unit capable of controlling opening and closing of a vent hole, and to a vent hole open/close control method that allows the control of the opening and closing of the vent hole.

BACKGROUND ART

Generally, vehicles such as automobiles are equipped with an airbag unit that expands and unfolds an airbag for absorbing impact on an occupant in an emergency case, for example collision and sudden deceleration. In addition, various types of airbag units have thus far been developed such as a driver airbag unit installed inside the steering wheel, a passenger airbag unit installed inside the instrument panel, a side airbag unit installed inside a lateral portion of the vehicle or inside the seat, a curtain airbag unit installed inside an upper portion of a door, a knee airbag unit for protecting the knees of an occupant, and a pedestrian airbag unit installed under the engine hood.

The airbag units generally include an airbag which is normally folded but expanded and unfolded in an emergency case, an inflator that supplies gas to the airbag, and a retainer that holds the airbag and the inflator. Further, airbags have been proposed that include a vent hole that allows the gas in the airbag to be discharged to outside and are configured to adjust the internal pressure of the airbag by controlling the opening and closing of the vent hole, for example as disclosed in Patent Literature (PTL) 1 to 3.

The airbag unit according to PTL 1 includes a variable vent hole that allows or restricts the flow of the gas in and outside of the airbag depending on the unfolding state of the airbag, and a flowing status modification unit that modifies the gas flow through the variable vent hole. The flowing status modification unit is configured, while the airbag is unfolded in stages in a plurality of directions, to allow the gas to flow in an initial expansion stage of the airbag and then selectively allow and restrict the gas flow after the initial expansion stage depending on the unfolding state of the airbag.

The airbag unit according to PTL 2 includes an open/close control unit to which a strap is removably attached, and a flap member connected to the distal end portion of the strap and disposed along the periphery of the vent hole so as to cover the vent hole. The flap member presses the periphery of the vent hole so as to close the vent hole while connected to the open/close control unit while the airbag is expanding, and opens the vent hole upon being disconnected from the open/close control unit while the airbag is expanding.

The airbag unit according to PTL 3 includes a first strap connected to a peripheral portion of the vent hole and a lower portion of an occupant-side base cloth of the airbag, and a second strap connected to an edge portion of the vent hole and a rear portion of the occupant-side base cloth of the airbag. The first strap is disposed so as to close the vent hole when the airbag is expanded and unfolded, and the second strap serves to pull the first strap together with the edge portion of the vent hole so as to open the vent hole, when the occupant is caught by the airbag.

CITATION LIST

Patent Literature

PTL 1: Japanese Unexamined Patent Application Publication No. 2005-14861
PTL 2: Japanese Unexamined Patent Application Publication No. 2007-307990
PTL 3: Japanese Unexamined Patent Application Publication No. 2010-58544

SUMMARY OF INVENTION

Technical Problem

The airbag unit according to PTL 1 includes a constantly-open vent hole which is open all the time, in addition to the variable vent hole. In case that the airbag is contacted by an obstacle in the initial stage of the expansion and unfolding, the gas is discharged through the variable vent hole and the constantly-open vent hole by shifting the variable vent hole to the closed state from the open state, so as to suppress an increase in internal pressure in the airbag, and when the airbag contacts the occupant upon completing the expansion and unfolding, the gas is discharged through the constantly-open vent hole, so as to mitigate the impact. With such a configuration, however, the gas is discharged only through the constantly-open vent hole after the expansion and unfolding. Accordingly, the constantly open vent hole has to be formed in a large size, which leads to an increase in gas leakage during the expansion and unfolding process. Therefore, the inflator has to have a larger capacity in order to supply a larger amount of gas into the airbag, which disables the airbag unit from being made lighter in weight.

With the airbag unit according to PTL 2, although the vent hole can be easily shifted from the closed state to the open state since the open/close control unit controls the opening and closing timing of the flap member, the strap is unable to be retained after being separated from the open/close control unit, and therefore the vent hole is unable to be shifted to the closed state. In addition, providing the open/close control unit in the airbag unit leads to an increase in weight and cost of the airbag unit.

The airbag unit according to PTL 3 is configured to shift the vent hole to the closed state from the open state to thereby maintain the internal pressure of the airbag during the expansion and unfolding process, and to again shift the vent hole to the open state upon binding the occupant thus to mitigate the impact. However, the airbag unit configured as above is intended to effectively apply the airbag to both the occupant wearing the seatbelt and the occupant not wearing the seatbelt, and therefore the control of the closed state and the open state is not strictly specified. Further, since the airbag unit includes both the first strap for shifting the vent hole from the open state to the closed state and the second strap for shifting the vent hole from the closed state to the open state, the structure and the open/close control method become complicated, and also the base cloth has to be formed in a larger size, which leads to an increase in weight.

The present invention has been accomplished in view of the foregoing drawbacks, and provides an airbag, an airbag unit, and a vent hole open/close control method that facilitate control of opening and closing of a vent hole, and suppress an increase in weight and cost of the airbag unit.

Solution to Problem

In an aspect, the present invention provides an airbag normally folded and located in a structure of a vehicle, and configured to be expanded and unfolded by gas in an emergency case, the airbag including a vent hole formed in a base cloth constituting the airbag, an open/close device configured to open and close the vent hole, and a stretch tether stretchable in stages and connected to the open/close device and an airbag component that moves when the airbag is expanded and unfolded. The stretch tether is configured to assume, depending on an expansion and unfolding status of the airbag, a first stage including transition from a slack state to a tense state, a second stage including stretching to a predetermined length while maintaining the tense state, and a third stage including being slackened when an occupant of the vehicle contacts the airbag. The open/close device is configured to maintain the vent hole in the open state in the first stage, maintain the vent hole in the closed state in the second stage, and shift the vent hole to the open state in the third stage.

In another aspect, the present invention provides an airbag unit including an airbag normally folded and configured to be expanded and unfolded in an emergency case, an inflator that supplies gas to the airbag, and a retainer that holds the airbag and the inflator, the airbag unit also including a vent hole formed in a base cloth constituting the airbag, an open/close device configured to open and close the vent hole, and a stretch tether stretchable in stages and connected to the open/close device and an airbag component that moves when the airbag is expanded and unfolded. The stretch tether is configured to assume, depending on an expansion and unfolding status of the airbag, a first stage including transition from a slack state to a tense state, a second stage including stretching to a predetermined length while maintaining the tense state, and a third stage including being slackened when an occupant of the vehicle contacts the airbag. The open/close device is configured to maintain the vent hole in the open state in the first stage, maintain the vent hole in the closed state in the second stage, and shift the vent hole to the open state in the third stage.

In the foregoing airbag and the airbag unit, the open/close device may include a valve element that closes the vent hole from an outer side, and a strap connecting between the valve element and the stretch tether, and the valve element may be folded so as not to close the vent hole when the airbag is folded.

The strap may be inserted into the airbag through a slit formed in the base cloth constituting the airbag and may include a projection protruding in a width direction of the strap. The projection may be located on an outer side of the slit in the first stage of the stretch tether. The valve element may be tearably sewn to the airbag in a folded state so as not to close the vent hole when the airbag is folded.

In still another aspect, the present invention provides a vent hole open/close control method applicable to an airbag normally folded and located in a structure of a vehicle and configured to be expanded and unfolded by gas in an emergency case, and including a vent hole that allows the gas in the airbag to be discharged to outside, an open/close device configured to open and close the vent hole, and a stretch tether stretchable in stages and connected to the open/close device and an airbag component that moves when the airbag is expanded and unfolded. The method includes identifying, depending on an expansion and unfolding status of the airbag, a first stage in which the stretch tether transits from a slack state to a tense state, a second stage in which the stretch tether stretches to a predetermined length while maintaining the tense state, and a third stage in which the stretch tether is slackened when an occupant of the vehicle contacts the airbag, and causing the open/close device to maintain the vent hole in the open state in the first stage, to maintain the vent hole in the closed state in the second stage, and to shift the vent hole to the open state in the third stage.

Advantageous Effects of Invention

With the airbag, the airbag unit, and the vent hole open/close control method configured as above, the open/close device is operated with the stretch tether that can be set to the first to the third stages according to the expansion and unfolding status of the airbag, so as to control the opening and closing of the vent hole, and therefore the vent hole can be shifted from the open state to the closed state, and again to the open state, at predetermined timings. Accordingly, in the case where the airbag contacts the occupant at an initial stage of the expansion and unfolding, for example when the occupant is located in the vicinity of the airbag, the impact on the occupant can be mitigated by discharging the gas through the vent hole. Through the intermediate and the terminal stages of the expansion and unfolding of the airbag the vent hole can be maintained in the closed state, and in the case where the airbag contacts the occupant in the intermediate and the terminal stages of the expansion and unfolding, the impact on the occupant can be mitigated by discharging the gas through the vent hole.

The foregoing configuration either eliminates the need to form the constantly-open vent hole, or allows the constantly-open vent hole to be formed in a minimum necessary size, thereby suppressing unnecessary discharge of the gas in the expansion and unfolding process of the airbag and allowing incorporation of a smaller-sized inflator thus reducing the weight and cost of the airbag unit. Consequently, the airbag, the airbag unit and the vent hole open/close control method according to the present invention can facilitate the control of the opening and closing of the vent hole, and suppress an increase in weight and cost of the airbag unit.

In addition, the open/close device of the vent hole is composed of the valve element and the strap and the valve element is folded so as not to close the vent hole when the airbag is folded. Such a configuration facilitates the vent hole to assume the open state at the initial stage of the expansion and unfolding process of the airbag.

Further, providing the strap with the projection of a predetermined shape and tearably sew the folded valve element to the airbag facilitate the vent hole to be maintained in the open state until the strap is subjected to a predetermined tension in the initial stage of the expansion and unfolding process of the airbag.

BRIEF DESCRIPTION OF DRAWINGS

FIG. 2(A) is a drawing showing a vent hole and an open/close device of the airbag shown in FIG. 1, FIG. 2(B) is a schematic drawing of a first example of the open/close device, and FIG. 2(C) is a schematic drawing of a second example of the open/close device.

FIGS. 3(A) to 3(F) are drawings showing how the open/close device work, FIG. 3(A) being a plan view of an open state in an initial stage of expansion and unfolding, FIG. 3(B) being a cross-sectional view taken along a line X-X in FIG. 3(A), FIG. 3(C) being a plan view of a closed state, FIG. 3(D) being a cross-sectional view taken along a line X-X in FIG. 3(C), FIG. 3(E) being a plan view of an open state at the time of contacting an occupant, and FIG. 3(F) being a cross-sectional view taken along a line X-X in FIG. 3(E).

FIGS. 10(A) to 10(D) are schematic drawings showing variations of the airbag unit, FIG. 10(A) showing a first variation, FIG. 10(B) showing a second variation, FIG. 10(C) showing a third variation, and FIG. 10(D) showing a fourth variation.

DESCRIPTION OF EMBODIMENTS

Figure 1:
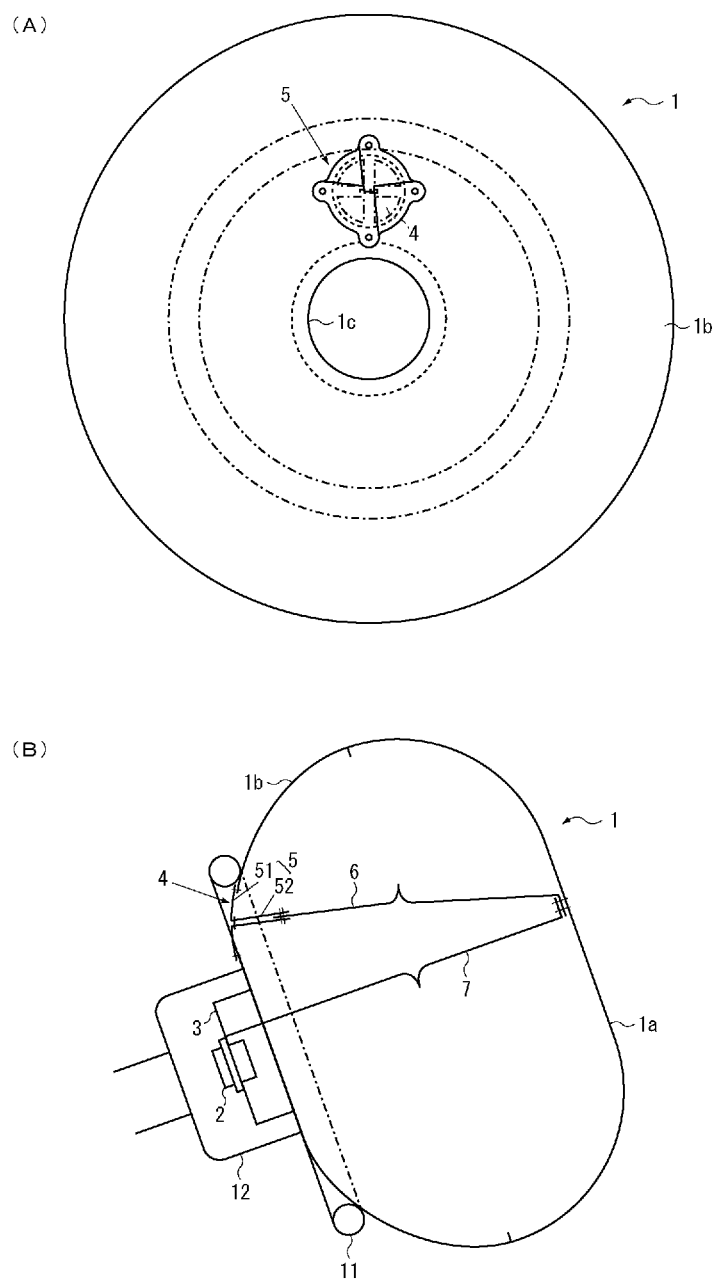
FIG. 1(A) is a rear view of an airbag and FIG. 1(B) is a cross-sectional view of an airbag unit, according to an embodiment of the present invention.
Figure 4:
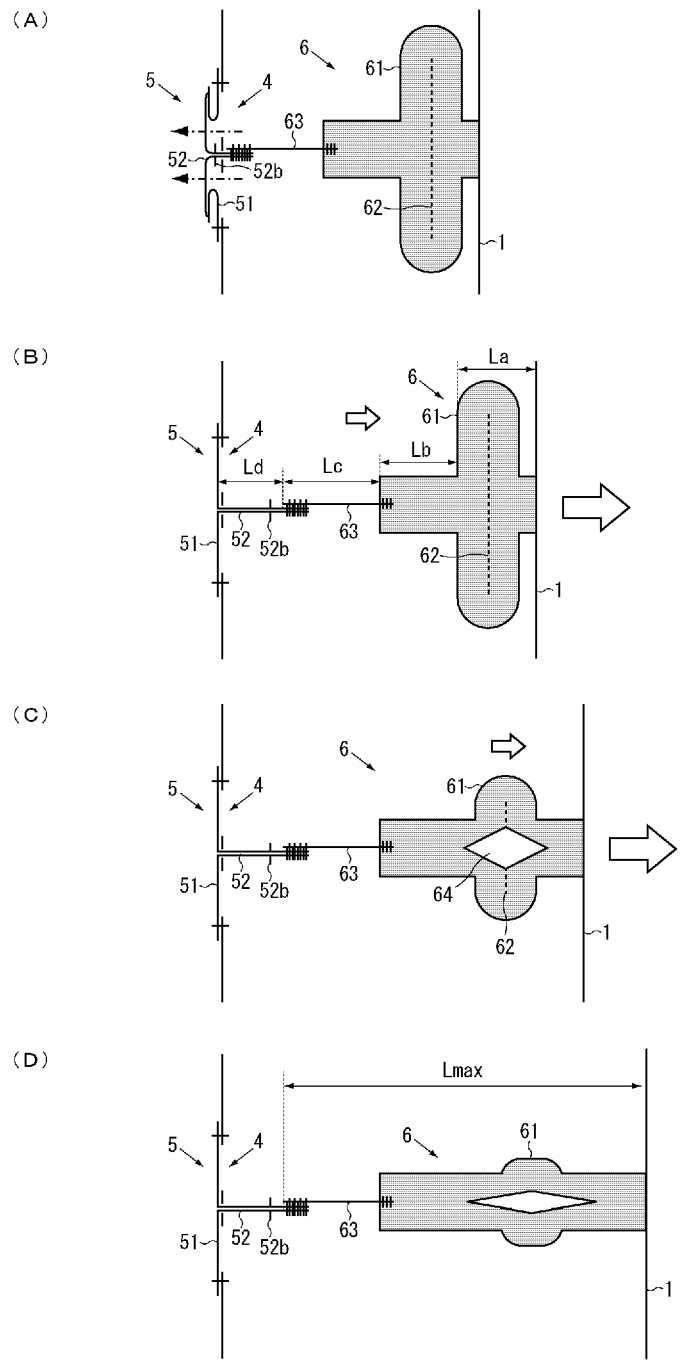
FIGS. 4(A) to 4(D) are schematic drawings showing transitions of the vent hole from the open state to the closed state, FIG. 4(A) showing a first stage of a stretch tether, FIG. 4(B) showing an initial state of a second stage of the stretch tether, FIG. 4(C) showing an intermediate state of the second stage of the stretch tether, and FIG. 4(D) showing a terminal state of the second stage of the stretch tether.
Figure 5:
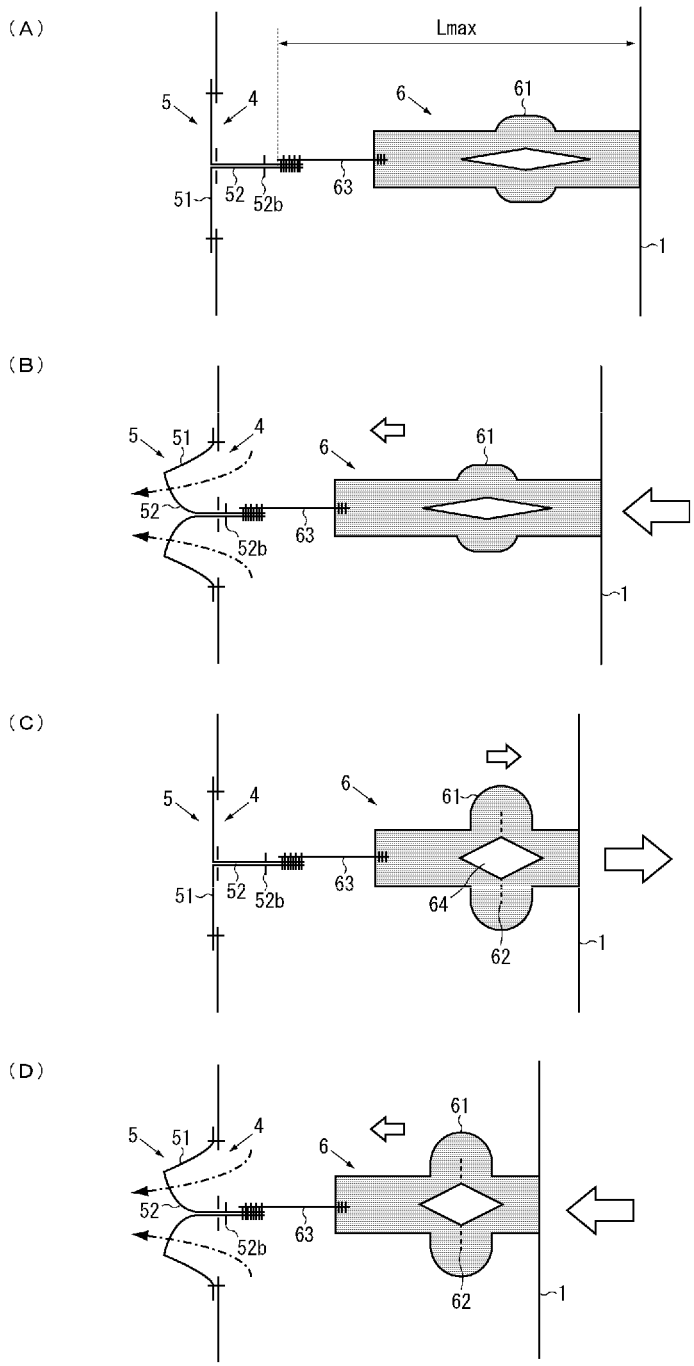
FIGS. 5(A) to 5(D) are schematic drawings showing transitions of the vent hole from the closed state to the open state, FIG. 5(A) showing the terminal state of the second stage of the stretch tether, FIG. 5(B) showing a third stage of the stretch tether, FIG. 5(C) showing the intermediate state of the second stage of the stretch tether, and FIG. 5(D) showing the third stage of the stretch tether.

Hereafter, an embodiment of the present invention will be described with reference to FIG. 1 to FIG. 10. FIG. 1(A) is a rear view of an airbag and FIG. 1(B) is a cross-sectional view of an airbag unit, according to the embodiment of the present invention. FIG. 2(A) is a drawing showing a vent hole and an open/close device of the airbag shown in FIG. 1, FIG. 2(B) is a schematic drawing of a first example of the open/close device, and FIG. 2(C) is a schematic drawing of a second example of the open/close device. Dash-dot lines drawn in an arcuate shape in FIGS. 2(A) to 2(C) represent lines along which the open/close device is to be sewn.

The airbag unit according to the embodiment of the present invention includes, as shown in FIG. 1 and FIG. 2, an airbag 1 normally folded and to be expanded and unfolded in an emergency case, an inflator 2 that supplies gas to the airbag 1, a retainer 3 that holds the airbag 1 and the inflator 2, a vent hole 4 formed in a base cloth constituting the airbag 1, an open/close device 5 configured to open and close the vent hole 4, and a stretch tether 6 stretchable in stages, connected to the open/close device 5 and an airbag component (for example, an inner wall of the airbag 1) that moves when the airbag 1 is expanded and unfolded. The stretch tether 6 is configured to assume, depending on the expansion and unfolding status of the airbag 1, a first stage including transition from a slack state to a tense state, a second stage including stretching to a predetermined length while maintaining the tense state, and a third stage including being slackened when an occupant contacts the airbag 1. The open/close device 5 is configured to maintain the vent hole 4 in the open state in the first stage, maintain the vent hole 4 in the closed state in the second stage, and shift the vent hole 4 to the open state in the third stage.

The airbag unit shown in FIG. 1(B) is a driver airbag unit for example, which is located in a boss portion 12 provided in a generally central position of a steering wheel 11 in front of the driver seat, and covered with a non-illustrated pad made of a resin. The airbag 1 starts to be expanded and unfolded when the inflator 2 is activated to supply gas into the airbag 1, and breaks up the pad so as to spread inside the cabin and expand forward of the driver on the driver seat.

The airbag 1 includes, for example, a first base cloth 1a to be brought into contact with the driver, and a second base cloth 1b located on the side of the steering wheel 11, and the first base cloth 1a and the second base cloth 1b are sewn together via the respective edges so as to form a bag constituting the airbag 1. As shown in FIG. 1(A), the second base cloth 1b includes an opening 1c formed at a generally central portion for mounting the inflator 2. The airbag 1 is fixed to the retainer 3 with a fixture such as a bolt and a nut (not shown), with a part of the inflator 2 inserted in the opening 1c and a bag ring (not shown) provided from the inner side. Here, a width restriction tether 7 may be provided inside the airbag 1 to restrict the projection width (thickness) of the airbag 1 in the expansion and unfolding process.

The inflator 2 is a gas generator that generates the gas supplied into the airbag 1 and, for example, has a generally disk-shaped outer shape. Although FIG. 1(B) illustrates the disk-shaped inflator 2, a cylindrical inflator having a column-shaped outer shape may be employed. The inflator 2 is connected to a non-illustrate electronic control unit (ECU), to be controlled on the basis of measurement values from an acceleration sensor and so on. When the ECU detects or predicts collision or sudden deceleration of the vehicle, the inflator 2 is ignited by an ignition current from the ECU, and burns a chemical stored inside the inflator 2 to thereby generate gas and supplies the gas into the airbag 1.

The retainer 3 serves to hold the airbag 1 and the inflator 2, and constitutes an airbag module upon being coupled with the pad. The airbag module is connected to the steering wheel boss portion 12 movably with respect thereto, so as to constitute a horn switch between the airbag module and the steering wheel boss portion 12. The steering wheel 11 is connected to the boss portion 12 via a plurality of spokes. The mentioned basic structure of the airbag unit composed of the airbag 1, the inflator 2 and the retainer 3 is merely an example, and the configuration of the airbag unit is not limited to the illustrated one.

The vent hole 4 is located, for example, in the second base cloth 1b constituting the rear face of the airbag 1, as shown in FIGS. 1(A) and 1(B). Such a configuration exempts the driver from being exposed to the gas discharged through the vent hole 4. In addition, for example the vent hole 4 is located at an inner position of the steering wheel 11. Accordingly, the vent hole 4 is located at a position opposing the direction in which the driver is contacted by the airbag 1 and subjected to the pressure, which facilitates the gas to be discharged.

FIG. 2(A) illustrates the shape of the vent hole 4. As shown in FIG. 2(A), the vent hole 4 has a circular shape as a whole, and includes a bridge portion 41 formed in the opening corresponding to the vent hole 4. In this example the bridge portion 41 is formed in a cross shape and includes a slit 42 of a generally I-shape formed in a central portion. Thus, the bridge portion 41 is divided into four regions (vent regions 4a to 4d) by the vent hole 4. The bridge portion 41 is, for example, formed of a part of the second base cloth 1b constituting the airbag 1. In other words, the bridge portion 41 and the vent hole 4 are formed by cutting away the vent regions 4a to 4d from the second base cloth 1b.

The mentioned configuration of the vent hole 4 is merely an example, and the vent hole 4 may be divided into two or three vent regions, or five or more vent regions, though not illustrated, and the vent regions may be formed in different sizes. Further, the bridge portion 41 may be formed in a generally Y-shape or T-shape according to the number of the divided vent regions, and the outer shape of the vent hole 4 may be square or a polygonal shape.

FIG. 2(B) illustrates a first example of the configuration of the open/close device 5. The open/close device 5 includes a valve element 51 for covering the vent hole 4 from an outer side, and a strap 52 connecting between the valve element 51 and the stretch tether 6. The valve element 51 has a generally fan shape. In the case where the four vent regions 4a to 4d are provided as shown in FIG. 2(A), the vent hole 4 is covered with four valve elements 51. The valve elements 51 each have a central angle not smaller than 90 degrees (for example, 90 to 100 degrees), so that adjacent valve elements 51 overlap on the bridge portion 41. In addition, tabs 51a are provided along the outer periphery of the valve element 51, at every 90 degrees of the vent hole 4. Accordingly, each of the valve elements 51 includes the tab 51a at two positions. The tabs 51a each include a pin hole through which a pin for positioning the valve element 51 is to be inserted.

It is not mandatory that the two sides of the valve element 51 formed in the fan shape are formed so as to overlap with the adjacent valve element 51, provided that the valve element 51 can cover the corresponding one of the vent regions 4a to 4d and be located on the bridge portion 41 in the closed state. In this case, the valve element 51 is formed with the central angle of approximately 90 degrees. The shape of the valve element 51 is to be determined in accordance with the shape of the vent regions, and the number of valve elements 51 is decided in accordance with the number of the vent regions.

The valve element 51 also includes a cut portion 51b formed along the extending direction of the strap 52. The strap 52 has, for example, a length necessary for maintaining the valve element 51 folded outward, and includes a joint portion 52a at the end portion opposite to the valve element 51. The joint portion 52a is used to sew the valve elements 51 together, and connected to the stretch tether 6. The strap 52 also includes a projection 52b protruding in the width direction. The projection 52b is wider than the slit 42 through which the strap 52 is inserted, so that the projection 52b is hooked with the slit 42 when the strap 52 passes the slit 42. Accordingly, when the projection 52b is drawn out from the airbag 1 the length between the projection 52b and the valve element 51 remains unchanged until the projection 52b is deformed and passes through the slit 42.

In the open/close device 5, two sets of valve elements 51 are formed, each set including a pair of valve elements 51 combined in a generally semicircular shape by superposing the tabs 51a of the respective valve elements 51 and tentatively fixing the tabs 51a. At this point, the straps 52 of the respective valve elements 51 are sewn together via the joint portion 52a. Then upon superposing the tabs 51a of the valve elements 51 of the respective sets combined in the generally semicircular shape and tentatively fixing the tabs 51a, the valve elements 51 are combined in the circular shape. At this point, the four straps 52 are superposed in the central portion of the valve elements 51 combined in the circular shape, and sewn together via the joint portion 52a.

Then the strap 52 is passed through the slit 42 formed in the central portion of the vent hole 4 with the valve element 51 combined in the circular shape as above, and the outer periphery of each of the valve elements 51 is sewn to the airbag 1. The method of attaching the valve elements 51 to the airbag 1 is not limited to the above. For example, the strap 52 of each valve element 51 may be passed through the slit 42, before the valve elements 51 are superposed and tentatively fixed.

A second example of the open/close device 5 shown in FIG. 2(C) is composed of the pair of valve elements 51 shown in FIG. 2(B) unified by connecting the valve elements 51 via the joint portions 52a of the respective straps 52. With the open/close device 5 configured as above, two sets of valve elements 51 are formed, each set being combined in a generally semicircular shape by superposing the tabs 51a of the respective valve elements 51 unified as above. In this case, the original straps 52 can be folded to form a single strap 52 by superposing the tabs 51a generally perpendicularly spaced from the straps 52. Upon superposing and tentatively fixing the tabs 51a of the respective sets of the valve elements 51 combined in the generally semicircular, the valve element 51 combined in a circular shape can be obtained, and the straps 52 are passed through the slit 42 formed in the central portion of the vent hole 4 with the valve element 51 combined in the circular shape, and then the outer periphery of each valve element 51 is sewn to the airbag 1.

Hereunder, the working of the mentioned open/close device 5 will be described. FIGS. 3(A) to 3(F) are drawings showing how the open/close device work, FIG. 3(A) being a plan view of the open state in the initial stage of expansion and unfolding, FIG. 3(B) being a cross-sectional view taken along a line X-X in FIG. 3(A), FIG. 3(C) being a plan view of the closed state, FIG. 3(D) being a cross-sectional view taken along a line X-X in FIG. 3(C), FIG. 3(E) being a plan view of the open state at the time of contacting the driver, and FIG. 3(F) being a cross-sectional view taken along a line X-X in FIG. 3(E).

As shown in FIG. 3(A), in the open/close device 5 the valve element 51 is folded with the vent regions 4a to 4d opened, so that the vent hole 4 (vent regions 4a to 4d) is maintained in the open state until gas is supplied from the inflator 2 to expand and unfold the airbag 1 to the extent that the stretch tether 6 is subjected to a predetermined tension. Thus, the open/close device 5 includes the valve element 51 covering the vent hole 4 on the outer side and the strap 52 connecting between the valve element 51 and the stretch tether 6, and the valve element 51 is folded so as not to close the vent hole 4 when the airbag 1 is folded.

Maintaining thus the vent hole 4 in the open state for a certain period of time in the initial stage of expansion and unfolding allows, for example in the case where the driver is close to the steering wheel 11 (for example, out of position) in the expansion and unfolding process of the airbag 1, the gas to be discharged through the vent hole 4 thereby mitigating the impact on the driver.

As shown in FIGS. 3(A) and 3(B), the valve element 51 is folded back to the outer side of the airbag 1, and hence the strap 52 is drawn out of the airbag 1 by a corresponding length. At this point, the projection 52b of the strap 52 is also located outside of the airbag 1. Such a configuration allows the projection 52b to serve as a stopper when the stretch tether 6 is subjected to a certain tension in the expansion and unfolding process of the airbag 1, to thereby maintain the open state of the vent hole 4 (vent regions 4a to 4d) until the stretch tether 6 is subjected to a larger tension that causes the projection 52b to pass through the slit 42.

Referring to FIGS. 3(C) and 3(D), when the stretch tether 6 is subjected to such a tension that causes the projection 52*b* to be drawn into the airbag 1, the strap 52 is drawn into the airbag 1 by the tension of the stretch tether 6, and the folded portion of the valve element 51 is unfolded toward the central portion of the vent hole 4, and thus closes the vent hole 4 (vent regions 4*a* to 4*d*).

Proceeding to FIGS. 3(E) and 3(F), for example in the case where the airbag 1 contacts the driver, the valve element 51 thus far covering the vent regions 4*a* to 4*d* is lifted up by an increase in internal pressure in the airbag 1 and the slackening of the stretch tether 6, so as to be separated from the surface of the airbag 1. At this point, since the outer periphery of the valve element 51 is connected to the airbag 1 and the strap 52 is inserted into the airbag 1 through the central portion of the vent hole 4, the valve element 51 is rolled up like a flower blooms, which allows the gas to be discharged through the central portion of the vent hole 4. Thus, the vent regions 4*a* to 4*d* is opened by releasing the valve element 51 when the stretch tether 6 is slackened.

With the mentioned configuration, since no obstacle is located on the outer side of the valve element 51 which has been rolled up, the gas in the airbag 1 can flow straight ahead and be discharged through the vent hole 4. Therefore, the gas can be immediately discharged to outside once the valve element 51 is rolled up, and the responsiveness (follow-up performance) of the gas discharge operation according to the internal pressure of the airbag 1 can be improved.

The stretch tether 6 may be formed of any desired string-shaped material provided that the material can draw the strap 52 of the valve element 51 in stages during the expansion and unfolding of the airbag 1. The stretch tether 6 has, for example, an end portion connected to the strap 52 and the other end portion connected to an airbag component that moves when the airbag 1 is expanded and unfolded. The airbag component may be, for example, an inner wall of the airbag 1, a width restriction tether 7 provided inside the airbag 1, or a rectifier cloth that rectifies the gas flow.

FIGS. 4(A) to 4(D) are schematic drawings showing transitions of the vent hole from the open state to the closed state, FIG. 4(A) showing a first stage of the stretch tether, FIG. 4(B) showing an initial state of a second stage of the stretch tether, FIG. 4(C) showing an intermediate state of the second stage of the stretch tether, and FIG. 4(D) showing a terminal state of the second stage of the stretch tether.

As shown in FIG. 4(A), the stretch tether 6 includes a widened portion 61 formed halfway of the stretch tether 6 in the stretching direction, a tearing portion 62 formed in the widened portion 61 so as to extend generally perpendicular to the stretching direction, and a connector 63 connected to the strap 52 of the open/close device 5. The tearing portion 62 is composed of, for example, a plurality of nicks or openings aligned in a straight or curved line at predetermined intervals. The nick may be a simple cutting line or a narrow slit. The opening may be a so-called pin hole, or a small circular or polygonal hole. The connector 63 may be an independent part sewn to the stretch tether 6 as illustrated, or an extended portion integrally formed with the base cloth.

The tearing portion 62 includes, for example, a primary tearing portion located in the central portion to be torn uniformly in the left and right direction, and a secondary tearing portion formed on the respective sides of the primary tearing portion to be alternately torn in the left and right direction. The primary tearing portion serves as a trigger (start point) for the stretch tether 6 to be torn at the tearing portion 62. The secondary tearing portion is configured so as to be alternately torn in the left and right direction when the stretch tether 6 is subjected to a tension, by adjusting the width of the slit in the left-right direction and the interval between the slits. Causing thus the tearing portion 62 to be torn owing to the expansion and unfolding of the airbag 1 allows an opening 64 to be formed in the stretch tether 6 and to gradually extend its length as shown in FIG. 4(C).

Referring to FIG. 4(A), the valve element 51 of the open/close device 5 is folded back as shown in FIG. 3(A) and hence the vent hole 4 (vent regions 4*a* to 4*d*) is in the open state, in the first stage in which the stretch tether 6 transits to the tense state from the slack state owing to the expansion and unfolding of the airbag 1. Since the stretch tether 6 is slack and the projection 52*b* of the strap 52 is located outside of the airbag 1 in the initial stage of the expansion and unfolding of the airbag 1, a part of the strap 52 remains slack until a tension large enough to draw the projection 52*b* into the airbag 1 is generated, despite the section from stretch tether 6 to the projection 52*b* being straightly aligned and the stretch tether 6 assuming the tense state owing to the expansion and unfolding of the airbag 1. Therefore, the valve element 51 of the open/close device 5 is maintained in the open state.

Thus, the strap 52 is inserted into the airbag 1 through the slit 42 formed in the base cloth constituting the airbag 1, and includes the projection 52*b* protruding in the width direction. The projection 52*b* is located on the outer side of the slit 42 in the first stage of the stretch tether 6, so that the open state of the vent hole 4 can be easily attained in the initial stage of the expansion and unfolding of the airbag 1.

Referring to FIG. 4(B), when the airbag 1 is further expanded and unfolded until the stretch tether 6 and the strap 52 of the open/close device 5 are subjected to a certain tension, the projection 52*b* is drawn into the airbag 1, and accordingly the strap 52 is also drawn into the airbag 1. Therefore, the valve element 51 of the open/close device 5 is displaced so as to close the vent hole 4 (vent regions 4*a* to 4*d*), and the vent hole 4 (vent regions 4*a* to 4*d*) transits to the closed state. The timing to set the vent hole 4 to the closed state can be controlled by adjusting one or more of the length (La+Lb+Lc) of the stretch tether 6, the length Ld of the strap 52 of the open/close device 5, and the magnitude of the tension (resistance of the projection 52*b*) to draw the projection 52*b* into the airbag 1. Here, the state shown in FIG. 4(B) corresponds to the initial state of the second stage in which the stretch tether 6 stretches to a predetermined length owing to the expansion and unfolding of the airbag 1, while maintaining the tense state.

Referring to FIG. 4(C), when the airbag 1 is further expanded and unfolded until the stretch tether 6 is subjected to a larger tension, the primary tearing portion of the tearing portion 62 is torn so as to form the opening 64, and the stretch tether 6 is elongated by a length corresponding to the size of the opening 64. The state shown in FIG. 4(C) corresponds to the intermediate state of the second stage in which the stretch tether 6 stretches to a predetermined length owing to the expansion and unfolding of the airbag 1, while maintaining the tense state.

Referring to FIG. 4(D), when the airbag 1 is further expanded and unfolded until the stretch tether 6 is subjected to an even larger tension, the secondary tearing portion of the tearing portion 62 is torn so as to further elongate the stretch tether 6. When the tearing portion 62 is entirely torn, the stretch tether 6 is elongated to a maximum length Lmax. The state shown in FIG. 4(D) corresponds to the terminal state of the second stage in which the stretch tether 6 stretches to a predetermined length owing to the expansion and unfolding of the airbag 1, while maintaining the tense state. As shown in FIG. 4(B) to FIG. 4(D), the vent hole 4 is maintained in the closed state during the second stage of the stretch tether 6, because the vent hole 4 is closed by the open/close device 5 and the stretch tether 6 is subjected to a certain tension.

FIGS. 5(A) to 5(D) are schematic drawings showing transitions of the vent hole from the closed state to the open state, FIG. 5(A) showing the terminal state of the second stage of the stretch tether, FIG. 5(B) showing a third stage of the stretch tether, FIG. 5(C) showing the intermediate state of the second stage of the stretch tether, and FIG. 5(D) showing the third stage of the stretch tether. Here, FIG. 5(A) illustrates the state corresponding to FIG. 4(D), and FIG. 5(C) illustrates the state corresponding to FIG. 4(C).

The terminal state of the second stage of the stretch tether shown in FIG. 5(A) represents the stage in which the expansion and unfolding of the airbag 1 has been completed. In the case where the airbag 1 contacts the driver in this state, the gas pressure of the airbag 1 is loaded on the valve element 51 of the open/close device 5, owing to the deformation of the airbag 1. Since the stretch tether 6 has been shifted to the slack state at this point, the valve element 51 is rolled up outward by the gas pressure, so that the vent hole 4 (vent regions 4a to 4d) is opened and the gas in the airbag 1 is discharged to outside. In other words, the vent hole 4 transits to the open state. Thus, in the third stage in which the airbag 1 contacts the driver and the stretch tether 6 is slackened, the open/close device 5 shifts the vent hole 4 to the open state.

Proceeding to FIG. 5(C), description will be given on the case where the airbag 1 contacts the driver in the intermediate state of the second stage of the stretch tether. At this point, although the airbag 1 has not been fully expanded and unfolded, the vent hole 4 is maintained in the closed state and hence a certain internal pressure is retained. When the airbag 1 contacts the driver in this state, the gas pressure of the airbag 1 is loaded on the valve element 51 of the open/close device 5, owing to the deformation of the airbag 1. Since the stretch tether 6 has been shifted to the slack state at this point, the valve element 51 is rolled up outward by the gas pressure, so that the vent hole 4 (vent regions 4a to 4d) is opened and the gas in the airbag 1 is discharged to outside. In other words, the vent hole 4 transits to the open state. Thus, in the intermediate state of the second stage of the stretch tether also, the stretch tether 6 may be shifted to the third stage in which the airbag 1 contacts the driver and the stretch tether 6 is slackened. In such a case also, the open/close device 5 serves to shift the vent hole 4 to the open state.

FIG. 6(A) is a graph showing changes with time of the aperture of the vent hole, and FIG. 6(B) is a graph showing changes with time of the internal pressure of the vent hole. In FIG. 6(A), the horizontal axis represents the time (msec) and the vertical axis represents the aperture (%) of the vent hole 4. In FIG. 6(B), the horizontal axis represents the time (msec) and the vertical axis represents the internal pressure (kPa) of the airbag 1.

In FIG. 6(A), a solid polygonal line Ka represents the change with time of the aperture of the vent hole 4 of the airbag 1 in a basic setting. The time point at which the airbag 1 has started to be expanded and unfolded is used as the reference (0 msec) in FIG. 6(A). Initially, the vent hole 4 is set to the open state by the open/close device 5. At the time point t1, the projection 52b of the strap 52 is drawn into the airbag 1, and the open/close device 5 shifts the vent hole 4 to the closed state. At the time point t2, the stretch tether 6 enters the tense state and the open/close device 5 completely closes the vent hole 4. In this state the airbag 1 continues to be expanded and unfolded, and at the time point t3 the airbag 1 is fully expanded and unfolded. When the airbag 1 contacts the driver at the time point t4 the stretch tether 6 is slackened and the open/close device 5 shifts the vent hole 4 to the open state. In FIG. 6(A), the period up to the time point t2 corresponds to the first stage in which the stretch tether 6 transits from the slack state to the tense state, the period from the time point t2 to the time point t4 corresponds to the second stage in which the stretch tether 6 stretches to a predetermined length while maintaining the tense state, and the period after the time point t4 corresponds to the third stage in which the airbag 1 contacts the driver and the stretch tether 6 is slackened.

Figure 6:
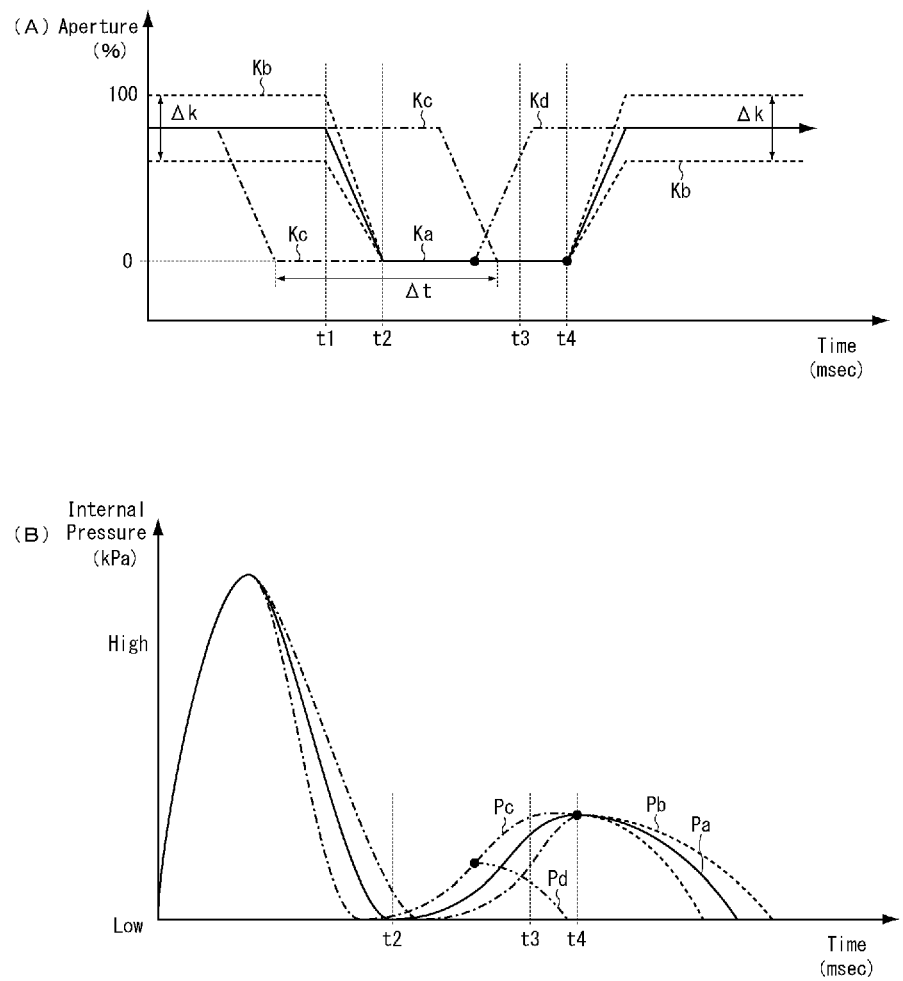
FIG. 6(A) is a graph showing changes with time of the aperture of the vent hole.
FIG. 6(B) is a graph showing changes with time of the internal pressure of the vent hole.
Figure 7:
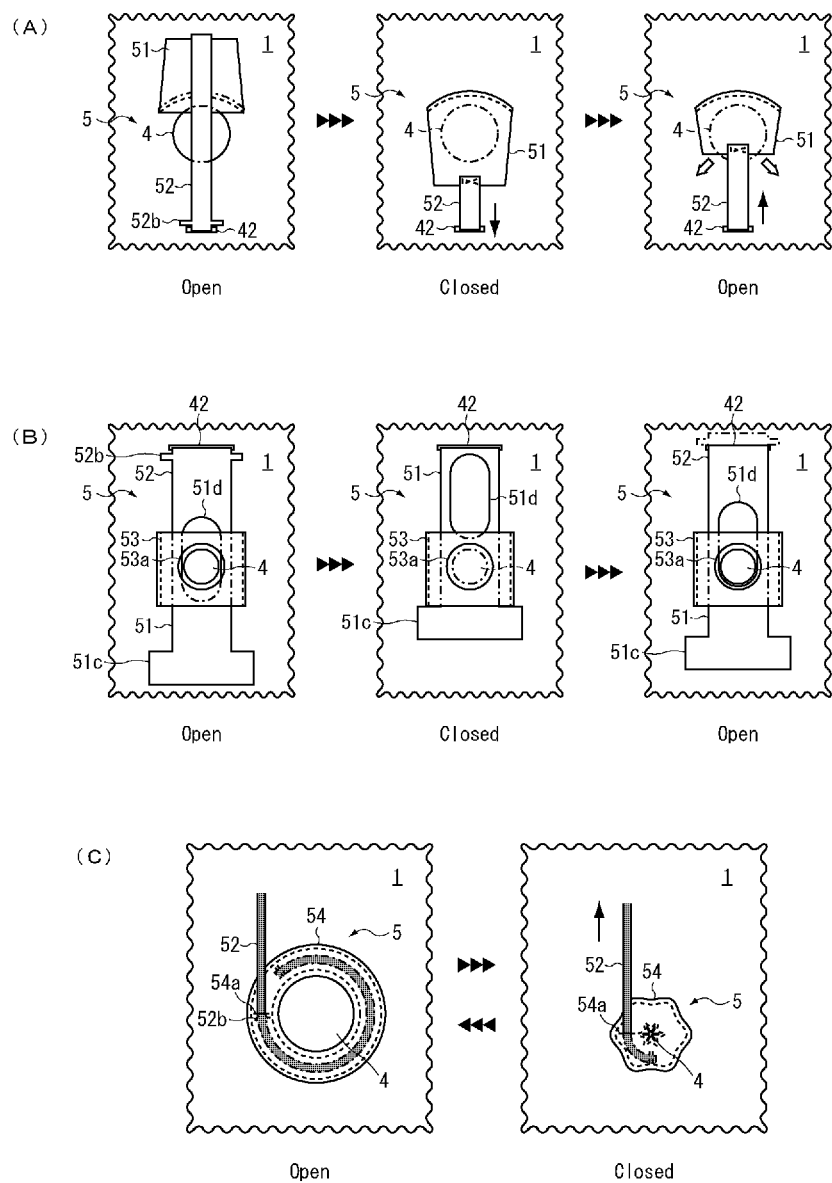
FIGS. 7(A) to 7(C) are schematic drawings showing variations of the open/close device, FIG. 7(A) showing a first variation, FIG. 7(B) showing a second variation, and FIG. 7(C) showing a third variation.
Figure 8:
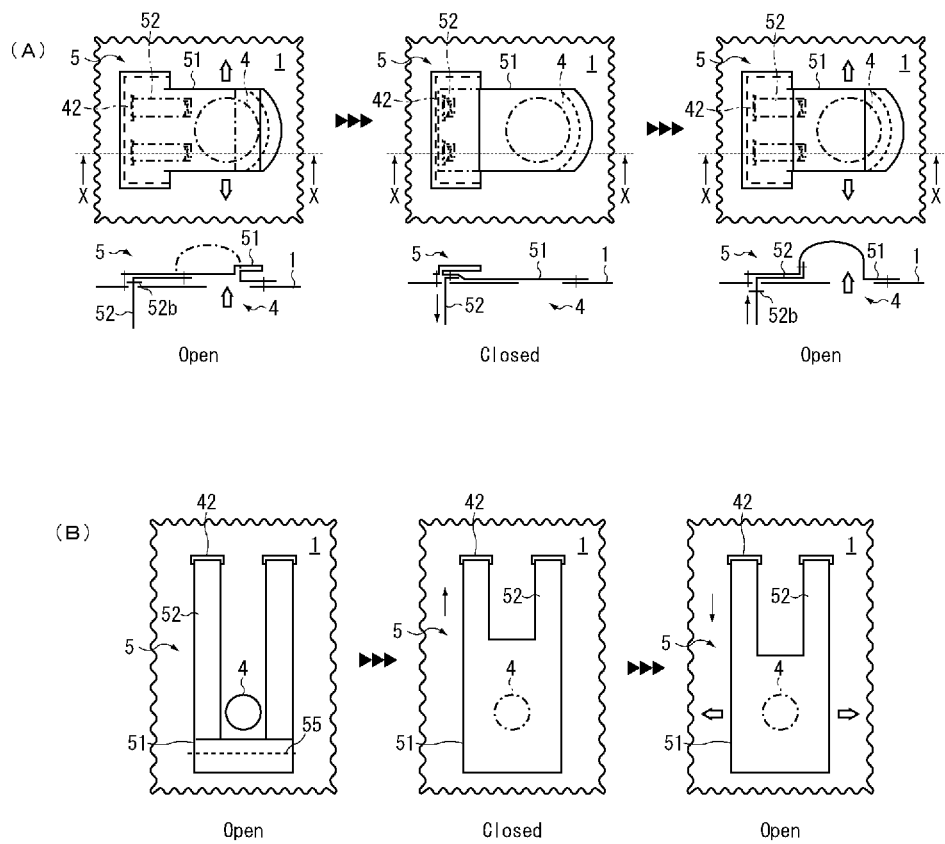
FIGS. 8(A) and 8(B) are schematic drawings showing a fourth variation and a fifth variation of the open/close device, respectively.
Figure 9:
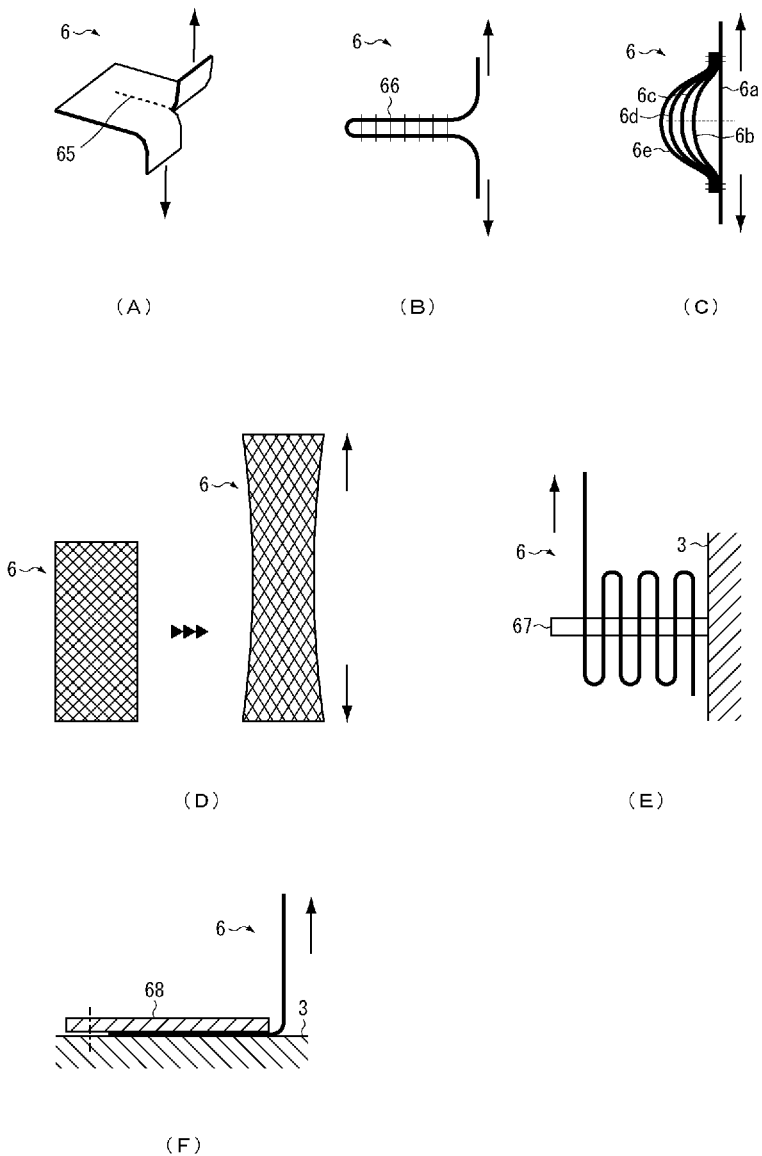
FIGS. 9(A) to 9(F) are schematic drawings showing variations of the stretch tether, FIG. 9(A) showing a first variation, FIG. 9(B) showing a second variation, FIG. 9(C) showing a third variation, FIG. 9(D) showing a fourth variation, FIG. 9(E) showing a fifth variation, and FIG. 9(F) showing a sixth variation.

A polygonal line Kb drawn in dot lines in FIG. 6(A) represents the case where the aperture of the vent hole 4 is adjusted. The aperture of the vent hole 4 can be adjusted by the length Ld of the strap 52 of the open/close device 5 shown in FIG. 4(B). To be more detailed, increasing the length Ld of the strap 52 allows the valve element 51 to be rolled up by a larger portion, and reducing the length Ld of the strap 52 allows the valve element 51 to be rolled up by a smaller portion. Adjusting thus the length Ld of the strap 52 enables controlling of the aperture of the vent hole 4, for example, in a range of $\Delta k$ in FIG. 6.

A polygonal line Kc drawn in dash-dot lines in FIG. 6(A) represents the case where the timing to shift the vent hole 4 to the closed state is adjusted. The timing to shift the vent hole 4 to the closed state can be controlled by adjusting one or more of the length (Lb+Lc) of the stretch tether 6, the length Ld of the strap 52, and the resistance of the projection 52b shown in FIG. 4(B). More specifically, increasing the total of the lengths Lb to Ld and/or increasing the resistance of the projection 52b allow the timing to shift the vent hole 4 to the closed state to be retarded, and reducing the total of the lengths Lb to Ld and/or reducing the resistance of the projection 52b allow the timing to shift the vent hole 4 to the closed state to be advanced. Thus, the timing to shift the vent hole 4 to the closed state can be controlled by adjusting the total of the lengths Lb to Ld and/or the resistance of the projection 52b, for example, in a range of $\Delta t$.

A polygonal line Kd drawn in dash-dot-dot lines in FIG. 6(A) represents the case where the airbag 1 has contacted the driver earlier than the time point t3, i.e., before the airbag 1 is fully expanded and unfolded. It is apparent that the vent hole 4 is shifted to the open state through a transition similar to the solid polygonal line Ka. In other words, even though the airbag 1 contacts the driver before being fully expanded and unfolded, the impact on the driver can equally be mitigated like in the case where the airbag 1 has contacted the driver after being fully expanded and unfolded.

A solid curved line Pa shown in FIG. 6(B) represents the change with time of the internal pressure of the airbag 1 in a basic setting. The time point at which the airbag 1 has started to be expanded and unfolded is used as the reference (0 msec) in FIG. 6(B). Although the vent hole 4 is initially set to the open state by the open/close device 5, the internal pressure in the airbag 1 sharply increases in the initial stage of the expansion and unfolding, because the volume of the airbag 1 is still small and a large amount of gas is supplied from the inflator 2. Then when the airbag 1 is expanded to a certain volume the internal pressure gradually decreases, partly because the vent hole 4 is maintained in the open state. At the time point t2, the stretch tether 6 enters the tense state and the open/close device 5 completely closes the vent hole 4, and therefore the internal pressure in the airbag 1 gradually increases. At the time point t3 the airbag 1 is fully expanded and unfolded, and when the airbag 1 contacts the driver at the time point t4, the stretch tether 6 is slackened and the open/close device 5 shifts the vent hole 4 to the open state. Accordingly, the gas in the airbag 1 is discharged to outside through the vent hole 4, and hence the internal pressure in the airbag 1 decreases.

A curved line Pb drawn in dot lines in FIG. 6(B) represents the case where the aperture of the vent hole 4 is adjusted. Since a larger amount of gas is discharged through the vent hole 4 in the case where the aperture is made larger, the internal pressure in the airbag 1 can be more quickly decreased. Making the aperture of the vent hole 4 smaller allows the internal pressure in the airbag 1 to be decreased over a longer period of time, because the amount of the gas discharged through the vent hole 4 is reduced.

A curved line Pc drawn in dash-dot lines in FIG. 6(B) represents the case where the timing to shift the vent hole 4 to the closed state is adjusted. Retarding the timing to shift the vent hole 4 to the closed state allows the internal pressure in the airbag 1 to again increase at a later time point after once decreasing. Shifting the vent hole 4 to the closed state at an earlier timing allows the internal pressure in the airbag 1 to again increase at an earlier time point after once decreasing.

A curved line Pd drawn in dash-dot-dot lines in FIG. 6(B) represents the case where the airbag 1 has contacted the driver earlier than the time point t3, i.e., before the airbag 1 is fully expanded and unfolded. In this case also, the vent hole 4 is shifted to the open state through a transition similar to the solid curved line Pa. Therefore, even though the airbag 1 contacts the driver before being fully expanded and unfolded, the impact on the driver can equally be mitigated by decreasing the internal pressure in the airbag 1, like in the case where the airbag 1 has contacted the driver after being fully expanded and unfolded.

Thus, the airbag unit configured as above includes the airbag 1 normally folded and located in a structure of a vehicle, configured to be expanded and unfolded by gas in an emergency case, and including the vent hole 4 that allows the gas in the airbag 1 to be discharged to outside. The airbag unit also includes the open/close device 5 configured to open and close the vent hole 4, and the stretch tether 6 stretchable in stages and connected to the open/close device 5 and an airbag component (for example, an inner wall of the airbag 1) that moves when the airbag 1 is expanded and unfolded. The airbag unit is configured to identify, depending on the expansion and unfolding status of the airbag 1, the first stage in which the stretch tether 6 transits from the slack state to the tense state, the second stage in which the stretch tether 6 stretches to a predetermined length while maintaining the tense state, and the third stage in which the airbag 1 contacts the driver and the stretch tether 6 is slackened, and to cause the open/close device 5 to maintain the vent hole 4 in the open state in the first stage, cause the open/close device 5 to maintain the vent hole 4 in the closed state in the second stage, and cause the open/close device 5 to shift the vent hole 4 to the open state in the third stage.

With the airbag 1, the airbag unit, and the vent hole open/close control method according to the foregoing embodiment, the open/close device 5 is operated with the stretch tether 6 that can be set to the first to the third stages according to the expansion and unfolding status of the airbag 1, so as to control the opening and closing of the vent hole 4, and therefore the vent hole 4 can be shifted from the open state to the closed state, and again to the open state, at predetermined timings. Accordingly, in the case where the airbag 1 contacts the driver at the initial stage of the expansion and unfolding, for example when the driver is located in the vicinity of the airbag 1, the impact on the driver can be mitigated by discharging the gas through the vent hole 4. Through the intermediate and the terminal stages of the expansion and unfolding of the airbag 1 the vent hole 4 can be maintained in the closed state, and in the case where the airbag 1 contacts the driver in the intermediate and the terminal stages of the expansion and unfolding, the impact on the driver can be mitigated by discharging the gas through the vent hole 4.

The configuration according to the foregoing embodiment either eliminates the need to form the constantly-open vent hole, or allows the constantly-open vent hole to be formed in a minimum necessary size, thereby suppressing unnecessary discharge of the gas in the expansion and unfolding process of the airbag 1 and allowing reduction in size of the inflator 2 thus reducing the weight and cost of the airbag unit.

Hereunder, some variations of the open/close device 5 will be described. FIGS. 7(A) to 7(C) are schematic drawings showing the variations of the open/close device, FIG. 7(A) showing a first variation, FIG. 7(B) showing a second variation, and FIG. 7(C) showing a third variation. FIGS. 8(A) and 8(B) are schematic drawings showing a fourth variation and a fifth variation of the open/close device, respectively. The open/close device 5 may be configured in various different manners as described below, without limitation to the configurations shown in FIG. 2 and FIG. 3.

The first variation of the open/close device 5 shown in FIG. 7(A) includes the valve element 51 having one end portion connected to the surface of the airbag 1 and the strap 52 connected to the other end portion of the valve element 51. The valve element 51 has a size that can close the vent hole 4 formed in the airbag 1. The strap 52 is drawn into the airbag 1 through the slit 42 formed in the airbag 1 and connected to the stretch tether 6, and includes the projection 52b formed halfway of the strap 52.

As shown in FIG. 7(A), the open/close device 5 is shifted from the open state to the closed state and again to the open state, from the left. In the open state of the first stage, the valve element 51 is folded so as to expose the vent hole 4, and the projection 52b of the strap 52 is drawn to the outer side of the airbag 1 through the slit 42. When the strap 52 is subjected to a certain tension the projection 52b is drawn into the airbag 1, and the valve element 51 is displaced so as to close the vent hole 4, so that the vent hole 4 is shifted to the closed state. Then when the airbag 1 contacts the driver and the stretch tether 6 is slackened, the strap 52 is drawn out of the airbag 1 so as to create a gap between the vent hole 4 and the valve element 51, and the vent hole 4 is shifted to the open state in which the gas can be discharged.

The second variation of the open/close device 5 shown in FIG. 7(B) includes the valve element 51 slidably disposed on the surface of the airbag 1 and the strap 52 formed integrally with the valve element 51. The valve element 51 is passed through a gap of a belt portion 53 sewn to the surface of the airbag 1, and includes a stopper 51c formed at a distal end portion so as to be engaged with the belt portion 53. The belt portion 53 includes an opening 53a through which the vent hole 4 can be exposed, and the valve element 51 includes an elliptical hole 51d that allows communication with the vent hole 4 and the opening 53a. In addition, the strap 52 is drawn into the airbag 1 through the slit 42 formed in the airbag 1 and connected to the stretch tether 6, and includes the projection 52b formed halfway of the strap 52.

As shown in FIG. 7(B), the open/close device 5 is shifted from the open state to the closed state and again to the open state, from the left. In the open state of the first stage, the valve element 51 is located at a position where the elliptical hole 51d communicates with the vent hole 4 and the opening 53a, and the projection 52b of the strap 52 is drawn to the outer side of the airbag 1 through the slit 42. When the strap 52 is subjected to a certain tension the projection 52b is drawn into the airbag 1, and hence the valve element 51 is displaced such that the elliptical hole 51d is deviated from the vent hole 4 and the opening 53a. When the stopper 51c is engaged with the belt portion 53 the vent hole 4 is completely closed, thus entering the closed state. Then when the airbag 1 contacts the driver and the stretch tether 6 is slackened, the strap 52 is drawn out of the airbag 1 and the valve element 51 is displaced so as to allow the elliptical hole 51d to communicate with the vent hole 4 and the opening 53a, and the vent hole 4 is shifted to the open state in which the gas can be discharged.

The third variation of the open/close device 5 shown in FIG. 7(C) includes an annular insertion path 54 formed along the peripheral edge of the vent hole 4 and the strap 52 having one end portion sewn to the insertion path 54. The strap 52 is drawn into the airbag 1 through a slit 54a formed in the insertion path 54 and connected to the stretch tether 6, and includes the projection 52b formed halfway of the strap 52.

As shown in FIG. 7(C), the open/close device 5 is shifted between the open state on the left and the closed state on the right. In the open state of the first stage, the projection 52b of the strap 52 is located in the insertion path 54 so that the vent hole 4 is opened. When the strap 52 is subjected to a certain tension, the projection 52b is drawn out of the insertion path 54 and the stitch portion of the strap 52 is attracted to the slit 54a. As a result, the portion of the base cloth around the vent hole 4 is gathered to the central portion, so that the vent hole 4 is shifted to the closed state. Then when the airbag 1 contacts the driver and the stretch tether 6 is slackened, the strap 52 is drawn back into the insertion path 54, and the vent hole 4 is shifted to the open state in which the gas can be discharged.

The fourth variation of the open/close device 5 shown in FIG. 8(A) includes the valve element 51 having the both end portions connected to the surface of the airbag 1 and the strap 52 connected to an intermediate portion of the valve element 51. In FIG. 8(A), the upper section shows a plan view, and the lower section shows a cross-sectional view taken along a line X-X. The valve element 51 is longer than the distance between the stitch portions of the respective sides, so that when a pressure is applied to the valve element 51 from inside of the airbag 1 the valve element 51 is lifted up from the vent hole 4 so as to allow the gas to be discharged through the gap. The strap 52 is drawn into the airbag 1 through the slit 42 formed in the airbag 1 and connected to the stretch tether 6, and includes the projection 52b formed halfway of the strap 52.

As shown in FIG. 8(A), the open/close device 5 is shifted from the open state to the closed state and again to the open state, from the left. In the open state of the first stage, the valve element 51 is folded by the side of the vent hole 4, and the projection 52b of the strap 52 is drawn to the outer side of the airbag 1 through the slit 42. Accordingly, when the valve element 51 is subjected to a pressure from inside of the airbag 1 the valve element 51 is easily lifted up from the vent hole 4 so as to allow the gas to be discharged through the gap. When the strap 52 is subjected to a certain tension, the projection 52b is drawn into the airbag 1 and hence the valve element 51 is displaced so as to close the vent hole 4 and folded on the side of the slit 42, and the vent hole 4 is shifted to the closed state. At this point, the valve element 51 is laid over the vent hole 4 in close contact therewith because the valve element 51 is pulled by the strap 52, and hence difficult to be lifted up from the vent hole 4 despite being subjected to a pressure from inside of the airbag 1. Then when the airbag 1 contacts the driver and the stretch tether 6 is slackened, the strap 52 is drawn out of the airbag 1 so as to create a gap between the vent hole 4 and the valve element 51, and the vent hole 4 is shifted to the open state in which the gas can be discharged.

The fifth variation of the open/close device 5 shown in FIG. 8(B) includes the valve element 51 having one end portion connected to the surface of the airbag 1 and the strap 52 connected to the other end portion of the valve element 51. The valve element 51 has a size that can close the vent hole 4 formed in the airbag 1. The strap 52 is drawn into the airbag 1 through the slit 42 formed in the airbag 1 and connected to the stretch tether 6, and includes the projection 52b formed halfway of the strap 52.

As shown in FIG. 8(B), the open/close device 5 is shifted from the open state to the closed state and again to the open state, from the left. In the open state of the first stage, the valve element 51 is folded by the side of the vent hole 4 so as to expose the vent hole 4, and tearably sewn in this state to the airbag 1 via a stitch portion 55. In other words, the valve element 51 is tearably sewn to the airbag 1 in a folded state so as not to close the vent hole 4 when the airbag 1 is folded, and the strap 52 is drawn to the outer side of the airbag 1 through the slit 42. When the strap 52 is subjected to a certain tension the valve element 51 is torn along the stitch portion 55 and the strap 52 is drawn into the airbag 1, and the valve element 51 is displaced so as to close the vent hole 4, so that the vent hole 4 is shifted to the closed state. Then when the airbag 1 contacts the driver and the stretch tether 6 is slackened, the strap 52 is drawn out of the airbag 1 so as to create a gap between the vent hole 4 and the valve element 51, and the vent hole 4 is shifted to the open state in which the gas can be discharged.

Some variations of the stretch tether 6 will be described hereunder. FIGS. 9(A) to 9(F) are schematic drawings showing the variations of the stretch tether, FIG. 9(A) showing a first variation, FIG. 9(B) showing a second variation, FIG. 9(C) showing a third variation, FIG. 9(D) showing a fourth variation, FIG. 9(E) showing a fifth variation, and FIG. 9(F) showing a sixth variation. The stretch tether 6 may be configured in various different manners as described below, without limitation to the configurations shown in FIG. 4 and FIG. 5.

The first variation of the stretch tether 6 shown in FIG. 9(A) includes a tearing portion 65 formed along the central portion of the stretch tether 6. Accordingly, the stretch tether 6 can be torn apart in the vertical direction, so as to be stretched in directions indicated by arrows.

The second variation of the stretch tether 6 shown in FIG. 9(B) includes a stitch portion 66 formed in a folded portion of the stretch tether 6. Accordingly, the stretch tether 6 can be stretched in directions indicated by arrows, by breaking the sewing thread of the stitch portion 66.

The third variation of the stretch tether 6 shown in FIG. 9(C) includes a first tether 6a constituting the base, and a second tether 6b, a third tether 6c, a fourth tether 6d, and a fifth tether 6e each having a length longer than the former one and sewn to the first tether 6a in a curved state, and the first tether 6a to the fourth tether 6d are tearable at the intermediate portion. Therefore, the first tether 6a to the fourth tether 6d can be sequentially torn by applying a certain tension to each of the tethers, and the stretch tether 6 can be stretched in directions indicated by arrows.

In the fourth variation of the stretch tether 6 shown in FIG. 9(D), the base cloth (woven fabric) constituting the stretch tether 6 is composed of meshes formed in directions intersecting the stretching directions indicated by arrows, to facilitate the base cloth itself to stretch thereby enabling the stretch tether 6 to stretch in the directions indicated by the arrows.

In the fifth variation of the stretch tether 6 shown in FIG. 9(E), a pin 67 is disposed so as to penetrate through a pleated portion formed by alternately folding back the stretch tether 6. Accordingly, upon applying a certain tension to the stretch tether 6, the stretch tether 6 can be sequentially torn at the positions where the pin 67 is located, thus to be stretched in the direction indicated by an arrow. In this case, the pin 67 is fixed to a portion of the airbag 1 that remains unmoved when the airbag 1 is expanded and unfolded, for example the retainer 3.

The sixth variation of the stretch tether 6 shown in FIG. 9(F) is configured to be retained by a frictional force. For example, a friction plate 68 is fixed to the surface of the retainer 3 and an end portion of the stretch tether 6 is held between the retainer 3 and the friction plate 68. When the stretch tether 6 is subjected to a tension greater than the frictional force of the friction plate 68, the stretch tether 6 is drawn out in the direction indicated by an arrow.

The foregoing configurations of the stretch tether 6 may be applied to the width restriction tether 7 that restricts the projection width (thickness) of the airbag 1 in the expansion and unfolding process. Applying the configuration of the stretchable tether to the width restriction tether 7 facilitates the airbag 1 to be expanded and unfolded in stages, and suppresses projection of the airbag 1 in the initial stage of the expansion and unfolding and oscillation of the airbag 1 in a front-back direction in the subsequent stages of the expansion and unfolding.

Now, some variations of the airbag unit will be described hereunder. FIGS. 10(A) to 10(D) are schematic drawings showing the variations of the airbag unit, FIG. 10(A) showing a first variation, FIG. 10(B) showing a second variation, FIG. 10(C) showing a third variation, and FIG. 10(D) showing a fourth variation. The constituents same as those of the airbag unit according to the foregoing embodiment will be given the same numeral, and the description thereof will not be repeated.

In the first variation of the airbag unit shown in FIG. 10(A), the vent hole 4 is located on an outer side of the steering wheel 11. The open/close device 5 is provided on the vent hole 4, and therefore the vent hole 4 can be opened and closed by the same operation according to the foregoing embodiments. Here, though not illustrated, the vent hole 4 may be provided on both the inner side and the outer side of the steering wheel 11.

The second variation of the airbag unit shown in FIG. 10(B) includes a plurality of vent holes 4 located on the inner side of the steering wheel 11. Providing the plurality of vent holes 4 facilitates the gas discharge amount to be increased, thereby facilitating the designing of the airbag unit according to the capacity of the airbag 1 and so forth.

In the third variation of the airbag unit shown in FIG. 10(C), the stretch tether 6 is connected to an intermediate portion of the width restriction tether 7 of the airbag 1. In this case, the width restriction tether 7 corresponds to the airbag component that moves when the airbag 1 is expanded and unfolded. Alternatively, the width restriction tether 7 may be formed of the stretch tether that can be stretched in stages, and the stretch tether 6 may be substituted with an ordinary tether.

The fourth variation of the airbag unit shown in FIG. 10(D) includes a cylindrical portion 6f formed inside of the airbag 1, the width restriction tether 7 that can be stretched in stages (stretch tether) connected to the surface of the cylindrical portion 6f, a loop tether 6g having one end portion connected to the retainer 3 and the other end portion inserted through the cylindrical portion 6f and connected to the retainer 3, and a connection tether 6h connected to the open/close device 5 and the loop tether 6g. In this case, it may be construed that the cylindrical portion 6f, the width restriction tether 7, the loop tether 6g, and the connection tether 6h constitute the stretch tether 6.

The present invention is in no way limited to the foregoing embodiment, but may be modified in various manners within the scope of the present invention. For example, airbag unit may be designed as a side airbag unit, a curtain airbag unit, a knee airbag unit, and a pedestrian airbag unit, other than the passenger airbag unit.

The invention claimed is:

1. An airbag, normally folded and located in a structure of a vehicle, and configured to be expanded and unfolded by gas in an emergency case, the airbag comprising:
    a vent hole formed in a base cloth constituting the airbag;
    an open/close device configured to open and close the vent hole; and
    a stretch tether stretchable in stages and connected to the open/close device and an airbag component that moves when the airbag is expanded and unfolded,
    wherein the open/close device includes a valve element that closes the vent hole from an outer side, and a strap connecting between the valve element and the stretch tether, and the valve element is folded so as not to close the vent hole when the airbag is folded,
    wherein the stretch tether is configured to assume, depending on an expansion and unfolding status of the airbag, a first stage including transition from a slack state to a tense state, a second stage including stretching to a predetermined length while maintaining the tense state, and a third stage including being slackened when an occupant of the vehicle contacts the airbag, and
    the open/close device is configured to maintain the vent hole in the open state in the first stage, maintain the vent hole in the closed state in the second stage, and shift the vent hole to the open state in the third stage.

2. The airbag according to claim 1,
    wherein the strap is inserted into the airbag through a slit formed in the base cloth constituting the airbag, and includes a projection protruding in a width direction of the strap, and
    the projection is located on an outer side of the slit in the first stage of the stretch tether.

3. The airbag according to claim 1,
    wherein the valve element is tearably sewn to the airbag in a folded state so as not to close the vent hole when the airbag is folded.

4. An airbag unit comprising an airbag normally folded and configured to be expanded and unfolded in an emergency case; an inflator that supplies gas to the airbag; and a retainer that holds the airbag and the inflator,
    wherein the airbag is the airbag according to claim 1.

5. A vent hole open/close control method applicable to an airbag normally folded and located in a structure of a vehicle and configured to be expanded and unfolded by gas in an emergency case, and including a vent hole that allows the gas in the airbag to be discharged to outside, the airbag including:
    an open/close device configured to open and close the vent hole; and
    a stretch tether stretchable in stages and connected to the open/close device and an airbag component that moves when the airbag is expanded and unfolded,
    wherein the open/close device includes a valve element that closes the vent hole from an outer side, and a strap connecting between the valve element and the stretch tether, and the valve element is folded so as not to close the vent hole when the airbag is folded,
    the method comprising:
    identifying, depending on an expansion and unfolding status of the airbag, a first stage in which the stretch tether transits from a slack state to a tense state, a second stage in which the stretch tether stretches to a predetermined length while maintaining the tense state, and
a third stage in which the stretch tether is slackened when an occupant of the vehicle contacts the airbag; and
causing the open/close device to maintain the vent hole in the open state in the first stage, to maintain the vent hole in the closed state in the second stage, and to shift the vent hole to the open state in the third stage.

* * * * *